(12) United States Patent
Worcester et al.

(10) Patent No.: US 11,171,679 B1
(45) Date of Patent: Nov. 9, 2021

(54) TACTICAL SPEAKER AND KITS INCLUDING THE SAME

(71) Applicants: Ryan Worcester, Hingham, MA (US); Dennis Rother, Alexandria, VA (US); Ann-Marie Lock, Washington, DC (US)

(72) Inventors: Ryan Worcester, Hingham, MA (US); Dennis Rother, Alexandria, VA (US); Ann-Marie Lock, Washington, DC (US)

(73) Assignee: GromaTech, LLC, Alexandria, VA (US)

( * ) Notice: Subject to any disclaimer, the term of this patent is extended or adjusted under 35 U.S.C. 154(b) by 0 days.

(21) Appl. No.: 16/851,372

(22) Filed: Apr. 17, 2020

(51) Int. Cl.
| | | |
|---|---|---|
| *H04B 1/3827* | (2015.01) | |
| *F21V 33/00* | (2006.01) | |
| *H04B 1/3883* | (2015.01) | |
| *H04R 1/02* | (2006.01) | |
| *F21Y 115/10* | (2016.01) | |

(52) U.S. Cl.
CPC ....... *H04B 1/3833* (2013.01); *F21V 33/0056* (2013.01); *H04B 1/3883* (2013.01); *H04R 1/028* (2013.01); *F21Y 2115/10* (2016.08); *H04R 2430/01* (2013.01)

(58) Field of Classification Search
CPC . H04B 1/3833; H04B 1/3883; F21V 33/0056; H04R 1/028; H04R 2430/01; F21Y 2115/10
See application file for complete search history.

(56) References Cited

U.S. PATENT DOCUMENTS

| | | | | |
|---|---|---|---|---|
| 5,004,105 | A * | 4/1991 | Freadman | A45C 7/0027 206/320 |
| 5,289,355 | A | 2/1994 | Cimock | |
| 5,644,294 | A | 7/1997 | Ness | |
| 5,929,393 | A * | 7/1999 | Jeter, Jr. | H04R 1/345 181/199 |
| 6,144,848 | A * | 11/2000 | Walsh | G06K 7/10 235/379 |
| 6,179,666 | B1 * | 1/2001 | Osborn | H04B 1/385 439/669 |
| 6,315,425 | B1 | 11/2001 | Confrey | |
| 6,536,917 | B1 | 3/2003 | Aperocho | |
| 6,711,005 | B2 | 3/2004 | Martin | |
| 8,150,460 | B1 * | 4/2012 | Curtis | H04R 5/04 455/557 |

(Continued)

FOREIGN PATENT DOCUMENTS

| | | |
|---|---|---|
| WO | 0030409 | 5/2000 |
| WO | 2009128274 | 10/2009 |

*Primary Examiner* — Nguyen T Vo
(74) *Attorney, Agent, or Firm* — Lambert Shorten & Connaughton; David J. Connaughton, Jr.; Justin P. Tinger

(57) ABSTRACT

An improved tactical, first responder and homeland security speaker is provided. The speaker has an interior or exterior flexible membrane made of silicone or other material and is configured to receive a plurality of radio sources and is operable on both AC and DC power. In a preferred embodiment, the speaker weighs less than one pound, has a maximum volume of greater than 100 Db, is operable on a PRC-148 radio battery as well as a variety of AC sources, including 110/220 V and 12V sources, and is able to receive several standard first responder, homeland security and military radio sources.

1 Claim, 8 Drawing Sheets

(56) References Cited

U.S. PATENT DOCUMENTS

| | | |
|---|---|---|
| 8,340,326 B2 | 12/2012 | Rauenzahn |
| 8,406,449 B2 | 3/2013 | Wegener |
| 9,088,843 B2 | 7/2015 | Ettinger |
| 2002/0057365 A1 | 5/2002 | Brown |
| 2006/0238998 A1 | 10/2006 | Bhavnani |
| 2007/0015485 A1 | 1/2007 | DeBiasio |
| 2007/0034248 A1 | 2/2007 | Romano |
| 2007/0111754 A1* | 5/2007 | Marshall ............... H04B 1/44 455/556.1 |
| 2008/0130867 A1* | 6/2008 | Bowen ................. H04M 1/03 379/443 |
| 2014/0286011 A1 | 9/2014 | Luna |
| 2015/0111491 A1* | 4/2015 | Jennings .............. H04W 4/10 455/3.06 |
| 2018/0249133 A1* | 8/2018 | Thiel .................. H01M 10/425 |
| 2020/0044675 A1* | 2/2020 | Mcindoe ............... H04R 3/00 |

* cited by examiner

TACTICAL SPEAKER AND KITS INCLUDING THE SAME

FIELD OF DISCLOSURE

The present disclosure relates generally to audio equipment and more specifically to speakers for use and installation in military, first responder and homeland security vehicles, aircrafts, boats, and other structures. The disclosed speaker is smaller than existing military, first responder and homeland security speakers, is lightweight and portable, and is advantageously compatible with existing radio technologies and power sources.

BACKGROUND

To complete missions, emergency first responders, border security and customs agents, and military personnel must execute complex operations having several moving parts flawlessly. Further, strategic operations may need to be modified in real time in response to unanticipated situations, environmental conditions, and other immediate threats. If one or more first responders, agents and soldiers modifies their courses of action, it is imperative that other personnel be alerted to this change. Communication is essential to the successful completion of critical missions.

Radio devices necessarily rely on speakers to deliver transmitted communications to their intended audience. Current radio speakers mounted are, however, too large and conspicuous to support many of these critical missions. Moreover, in addition to their bulk, current police, commercial, industrial and military type radio speakers are also heavy and thus are not portable. Current speakers also fail to adequately amplify sound and lack other features desirable in austere environments. These known speakers are difficult to clean and maintain, further compounding the negatives associated with their use.

There thus exists a need for a speaker that is compatible with existing commercial, industrial and military radio technologies that is suitable for use in dynamic envronments. There is an immediate need for a speaker that is lightweight, portable, and able to be inconspicuously mounted and used in a wide range of vehicles, aircrafts, and boats, and has features that render it suitable for use during first responder and military operations.

SUMMARY OF DISCLOSURE

The present disclosure is directed to first responder, military and homeland security speakers having enhanced properties and characteristics. In accordance with aspects and embodiments, a speaker is provided comprising a silicone housing, an audio port configured to receive a plurality of radio sources and a battery connection configured to receive a plurality of power supplies. The speaker further includes an integrated microphone and a push-to-talk button. In accordance with embodiments, the speakers may include a first LED light configured to turn on when an incoming radio transmission is received by the speaker and may further include a second LED light adjacent the first LED light configured to change colors when a battery connected to the speaker drops below a threshold percentage of the battery's total charge. The disclosed speakers may include a blackout side having a first position, wherein both the first and second LED lights are visible and a second position wherein the first and second LED lights are blocked.

In accordance with embodiments, the speaker may be configured to receive radio transmissions from a PRC-148 radio, a PRC-152A radio, a PRC-117G radio, a PRC-117G radio, a Wave Relay MPU-4 radio, and a Wave Relay MPU-5 radio. The speaker may be configured to operate on AC power and DC power and may be operable by direct connection to a PRC-148 radio battery. In accordance with embodiments, the speaker may also be operable when connected to a 12V power supply, a 110/220V power supply, and a BBXX90 battery. The disclosed speakers may weigh less than one pound and the audio ports where radio cables are received may be configured to receive a standard $\frac{1}{8}^{th}$ headphone jack.

In accordance with aspects and embodiments, a speaker kit is disclosed. The kits disclosed comprise a rigid case that includes a speaker, radio connection cables, batteries, power cables, and other features. In accordance with embodiments, the speaker in the speaker kit comprises an audio port configured to receive a plurality of radio sources and a battery connection configured to receive a plurality of power supplies, and the speaker weighs less than one pound and is able to operate on both AC and DC power. The radio cables in the kit are configured to be connected to a radio source and received by the audio port of the speaker and at least one battery is provided in the kit that is configured to be received by the speaker battery connection and able to power to the speaker. The plurality of power cables provided in the kit are configured to connect to various power supplies and be received by the speaker battery connection to provide power the speaker.

The speaker kit may further include a speaker cleaning kit and one or more MOLLE speaker pouches. One or more pouch may be provided for carrying the radio on the body and one or more pouches may be provided for mounting the radio in a vehicle. The radio cables may include at least one 6-pin U-229 cable and at least one 3.5 mm audio cable, and each may terminate in a $\frac{1}{8}^{th}$ in. standard headphone jack.

The batteries provided in the speaker kits disclosed may include at least one PRC-148 radio battery and the plurality of power cables included in the kit may include one 110/220 V power supply cable, a BBXX90 power supply cable, and a 12V power supply cable.

DETAILED DESCRIPTION

Figure 1:
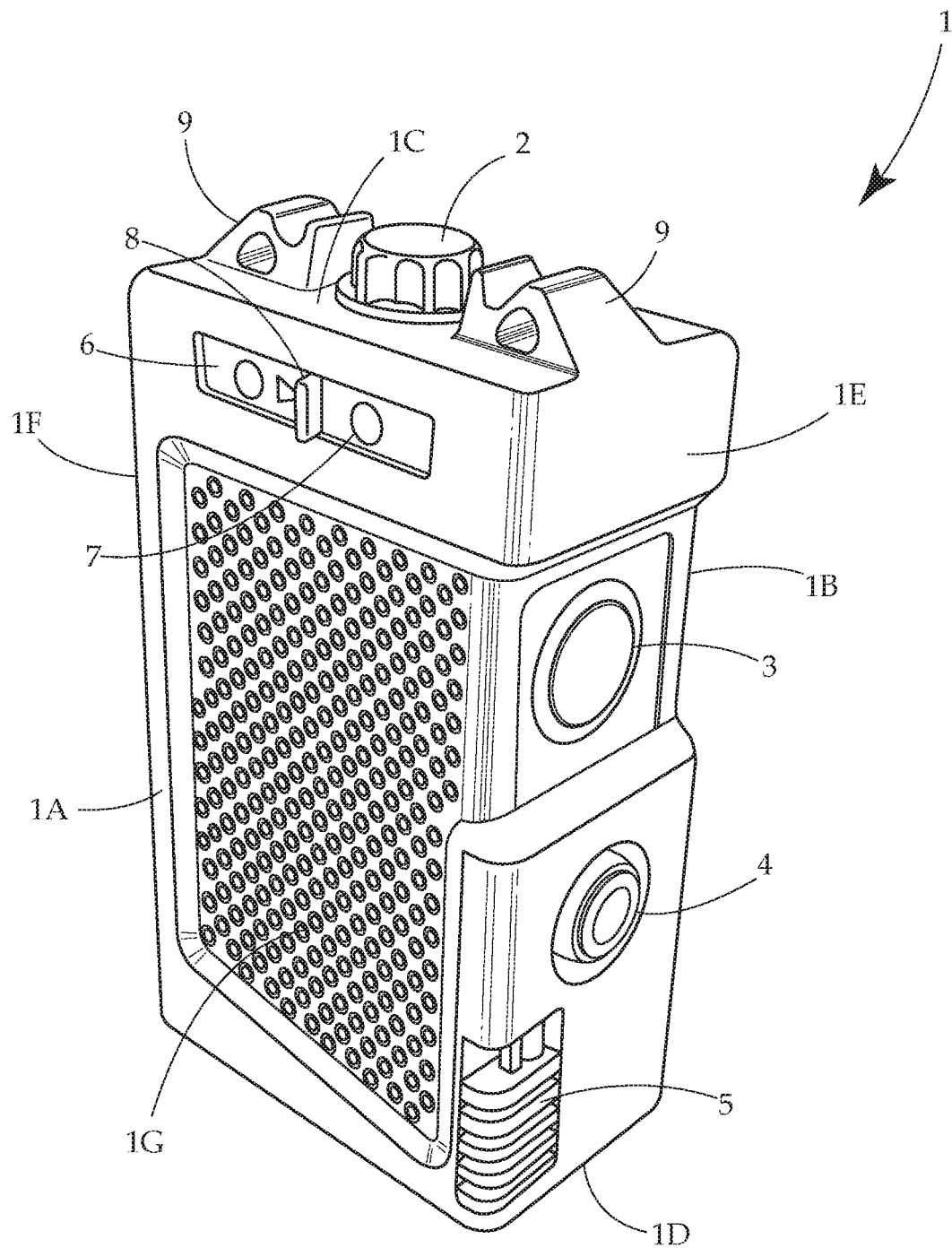
FIG. 1 provides a speaker in accordance with embodiments of the disclosure.

The present disclosure is directed to a speaker having a reduced size and weight compared to existing military speakers. The disclosed speaker advantageously makes use of existing commercial technologies and integrates them in a novel manner to provide an improved audio system in a more compact package. The disclosed speaker may further include additional features not available in current speakers that are particularly desirable in tactical and military operations.

The speakers of the present disclosure advantageously connect with existing radio technologies, including commercial, first responder and military radio technologies, including software-defined combat-net radio technologies. For example, the disclosed speaker may connect with Multiband Inter/Intra Team Radio systems (MBITR) including but not limited to the PRC-148 MBITR manufactured by Thales Communications. The disclosed speaker may connect with Multiband Radios, including the PRC-150 and the PRC-152A, both manufactured by Harris Corporation, and Multiband Multi Mission Radios (MBMMR), including the PRC-117G, also manufactured by the Harris Corporation. The disclosed speaker may also connect with Mobile Ad Hoc Networking Systems (MANET), including the Wave Relay® MPU-4 and MPU-5, manufactured by Persistent Systems, LLC.

The disclosed speakers may be somewhat, substantially, or significantly smaller than existing comparable known commercial, first responder and military speakers used in connection with the same radio technologies. For example, the MRC-67 amplified speaker manufactured by UltraLife Communications Systems is a speaker commonly found in vehicles used in tactical environments. It weighs 3.6 lbs. and has dimensions of 4.75×4.75×3.75 inches, for a total volume of 84 cubic inches. The speakers of the present invention may weigh less than 1 pound and have dimensions that result in a volume of less than 20 cubic inches.

The disclosed speakers may perform objectively better than larger known speakers and may have features not available in larger known speakers. For example, the MRC-67 has a maximum volume of 90 dBs. The disclosed speakers may have a maximum volume of greater than 100 dBs. Some known speakers, including for example the MRC-67 do not have direct connections to portable radio communication (PRC) batteries. The disclosed speakers may have direct connections to PRC batteries. Some known speakers, including for example the MRC-67, do not have an integrated microphone or integrated push-to-talk (PTT) features. The disclosed speakers include integrated microphones and integrated PTT.

The speakers of the present disclosure are advantageously capable of accepting both DC and AC input power. The disclosed speakers are thus operational using a wide range of power sources including, but not limited to, 12V power supplies, 110/220 VAC power sources, and BBXX90 batteries. The disclosed speakers also include Modular Lightweight Load-carrying Equipment (MOLLE) mounts and may be mounted in various installation positions in military vehicles, aircrafts, watercrafts, and structures. Alternatively, the disclosed speakers having MOLLE mounts may be carried in a MOLLE rucksack or on a MOLLE plate carrier for field use. Moreover, the disclosed speakers can be easily converted from from manportable, to semi-permanent, to permanent mounting configurations by virtue of their MOLLE mounts.

The size, weight, and features of the disclosed speakers make them suitable for installation on a wide array of vehicles. Moreover, multiple locations may be available for ideal placement, and radio cable connections may be provided at fixed or custom lengths to support radio installation throughout vehicle cabins. The disclosed speakers may be installed in light terrain-all tertian vehicles (LT-ATVs), mine-resistant ambush protected vehicles (M-ATVs), ground mobility vehicles used in naval operations (GMV-Ns), as well as commercial vehicles. The disclosed speakers may be installed in physical structures, including emergency operations centers (EOC), aircrafts, including non-standard aircrafts (NS-A), and boats, including waterborne assault crafts (WAC). Other suitable locations for installation and use of the disclosed speakers will be readily ascertained by those of skill in the art.

Referring to FIG. 1, a speaker 100 in accordance with aspects and embodiments is disclosed. Speaker 100 has housing 1 having an interior or exterior flexible membrane made of silicone or other material. The flexible membrane provides ingress protection, making speaker 100 water and dust resistant. Speaker 100 having silicone housing 1 may have an ingress protection rating (IP) of 67, as determined by the International Electrotechnical Commission (IEC). The first numeral the IP rating, 6, indicates that speaker 100 is dust-tight and completely protected from dust. The second numeral of the IP rating, 7, indicates that speaker 100 is protected from the ingress of water at an immersion of up to 1 m for 30 minutes. Housing 1 is generally rectangular in shape and has front 1A, back 1B, top 1C bottom 1D and sides 1E and 1F. Front 1C has perforated silicone surface 1G. In a preferred embodiment, speaker 100 has measurements no greater than a height of 5.75 inches, a length of 2.85 inches, and a width of 2.25 inches, and a volume of less than or equal to 31.5 cubic inches. In preferred embodiments, speaker 100 weights less than 1 pound and no more than 13 ounces.

Power knob 2 is positioned on the top of housing 1 on surface 1C. Knob 2 has detents to allow for easy manipulation and is also manipulated to control the volume of audio that emanates from perforated silicone surface 1G when speaker 100 is operated. In some embodiments, knob 2 may be further positioned to control volume modes. For example, knob 2 may be positioned to cause speaker 100 to perform in a particular volume mode, such as linear or log mode. In some embodiments, speaker 100 may be programmable to perform in a combination of volume responses. In some embodiments, power, mode, and/or volume functionalities may be controlled by separate elements on housing 1 but are most preferably controlled by a single element knob 2.

Speaker 100 has an integrated, internal, microphone within housing 1 and further includes an integrated push-to-talk (PTT) feature accessible when speaker 100 is connected to a radio source that accommodates (PTT). PTT button 3 is located on side 1E of housing 1 and is depressed to key PTT. When PTT keyed, speaker 100 may automatically be muted. Radio sources are connected to speaker 100 via audio port 4 located below PTT button 3 on side 1E of housing 1. Battery release 5 is proximate the bottom of the housing on side 1E and is engaged to release a battery (not shown).

Audio port 4 is configured to receive a cable connected to a radio. Audio port 4 may receive a cable connected any one of the following radios: PRC-148, PRC-152A, PRC-117G, PRC-150(T), Wave Relay MPU-4, and Wave Relay MPU-5 radios and commercial audio inputs. In other embodiments, audio port 4 may be configured to receive a cable connected to radios and other audio sources in addition to those recited above, and suitable radios for cable connection to audio port 4 will be readily ascertained by those of skill in the art. Audio port 4 may be configured to receive to a standard $\frac{1}{8}^{th}$ inch audio jack connector. Audio port 4 may receive a 3.5

MM audio cable and a 6-pin U-229 cable directly or may receive a single from such a cable via a standard 1/8$^{th}$ inch audio jack connector received by audio port 4.

Figure 2:
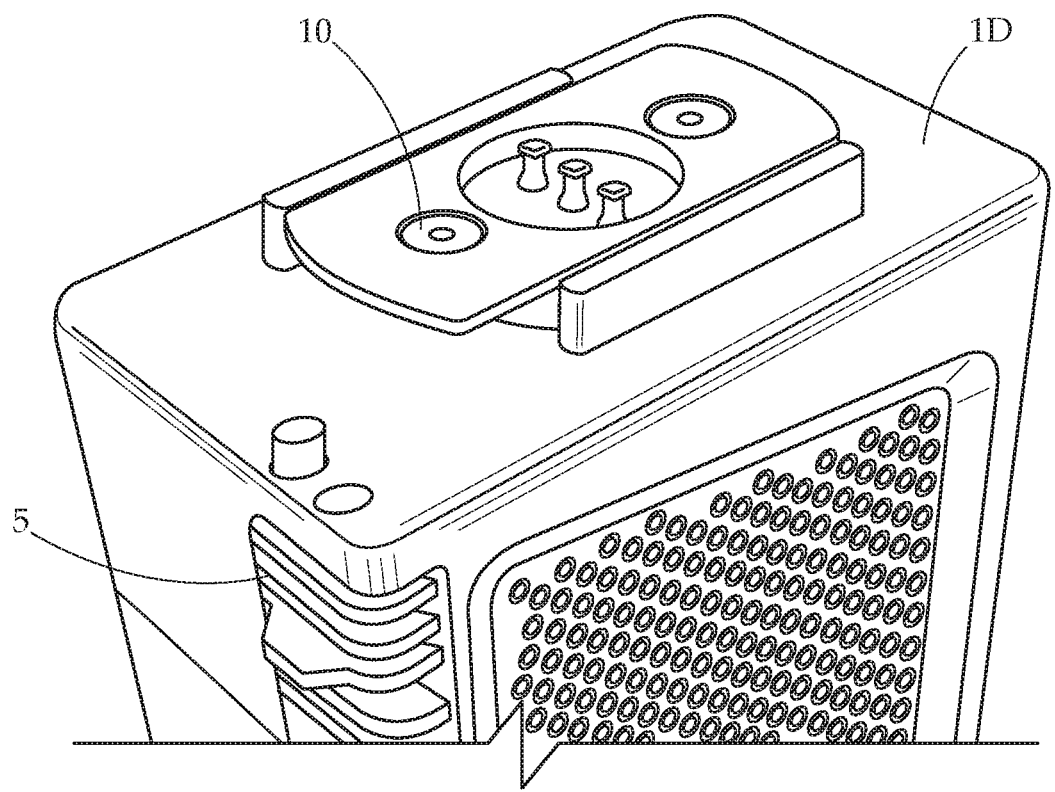
FIG. 2 provides a view of an aspect of a speaker in accordance with aspects and embodiments of the disclosure.

The audio input received via audio port 4 may support 1.6 $V_{RMS}$ and the audio output of speaker 100 may not exceed 5 watts (nominal) with a total harmonic distortion of less than 1%. The audio band pass may be between 150 Hz to about 10,000 Hz. The sound pressure may be greater than about 90 Dba, greater than about 96 Dba, or greater than about 100 Dba Referring to FIG. 2 in conjunction with FIG. 1, speaker 1 further includes power supply connecter 10 on bottom surface 1D. Power supply connector 10 is a contaminant resistant latch that allows quick cleaning and service. Speaker 1 accommodates a direct current (DC) input voltage via connecter 10 of 5-36 VDC. Connector 10 connects to a battery by a twist-lock engagement and is configured to interface with intentionally non-compatible batteries. Speaker 100 includes within housing 1 power input protections to protect against damage from power received at connector 10. These power input protections include but not limited to reverse polarity and short circuit protections against voltage spikes to 500 VDC, voltage surges to 100 VDC, and over-current and low voltage drop out. Connector 10 may also be used to connect speaker 10 to an AC power supply via power cables. For example, connector 10 may receive a 12V commercial vehicle power cable, a 110-220V wall power cable, and a BBXX90 battery power cable.

Figure 7:
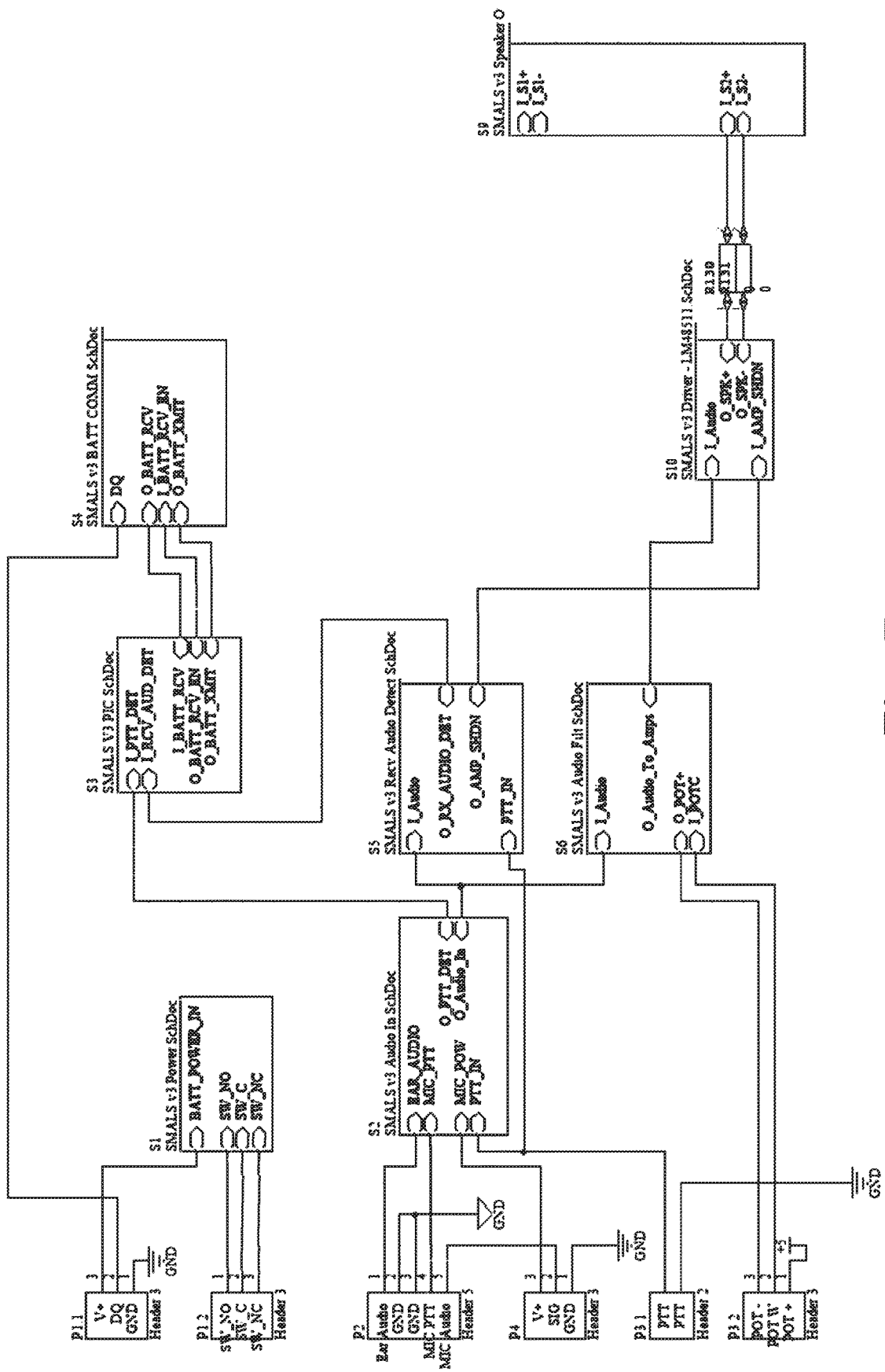
FIG. 7 shows a block diagram of a speaker in accordance with aspects and embodiments of the disclosure.
Figure 8:
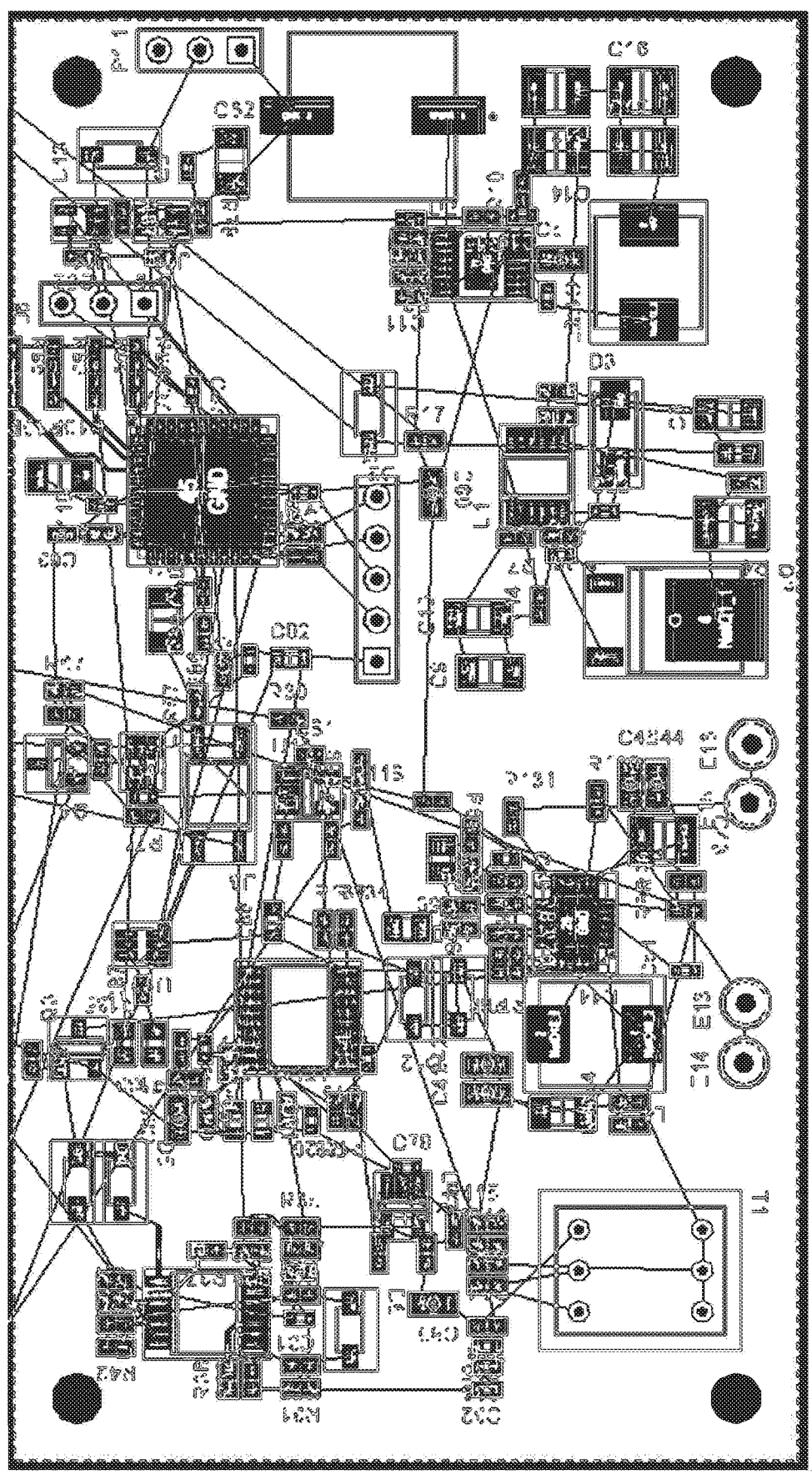
FIG. 8 shows a circuit board of a speaker in accordance with aspects and embodiments of the disclosure.

The arrangement of the electrical components within housing 1 of speaker 100 are advantageously positioned in a circuit that operates speaker 100 at low power, providing for extended use of speaker 100 on a single battery. In a preferred embodiment, speaker 100 having a battery connected to it via connecter 10 draws less than 200 milliamps (mA) at 28 VDC. In a preferred embodiment, the disclosed speaker operates for at least 24 hours on an 8:1:1 duty cycle of a fully charged PRC-148 battery. The low current drawn by speaker 100 is a key feature rendering it suitable and desirable for tactical operations, particularly in situations when access to replacement batteries or additional power sources become unavailable. An exemplary block diagram of speaker 100 having the disclosed audio and electrical features is shown in FIG. 7 and an exemplary circuit board for speaker 100 is shown in FIG. 8.

Speaker 100 has LED lights 6 and 7 on front 1A above perforated surface 1G. LED light 6 indicates power function. For example, LED light 6 may glow a first color when power is being received from continuous, AC, source, or when power is being drawn from a fully charged battery. LED light 6 may change to a second color or flash intermittently when the battery from which power is being drawn falls below a certain threshold of its maximum charge, and for example, when the battery falls below 20% of full charge. In preferred embodiments, LED light 6 is green and Night Vision Goggle (NVG) compatible. LED 7 may glow a color different than LED 6 and indicates when an audio transmission is being received from a radio source connected to speaker 100 via port 4. In a preferred embodiment, LED 6 is NVG yellow. Speaker 100 further includes blackout slide 8.

Figure 3A:
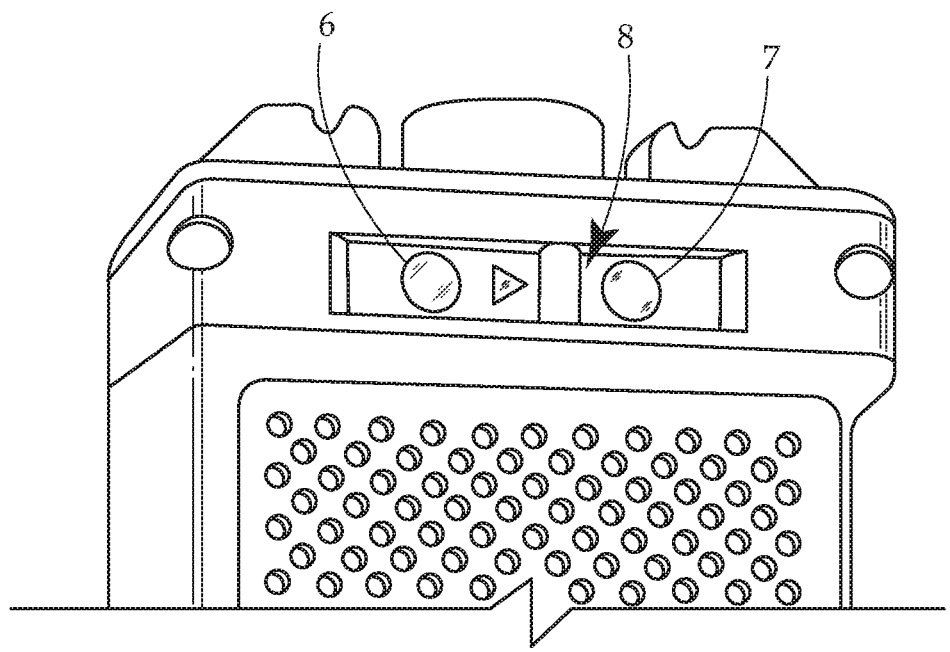
FIG. 3A provides a view of an aspect of a speaker in accordance with embodiments of the disclosure.
Figure 3B:
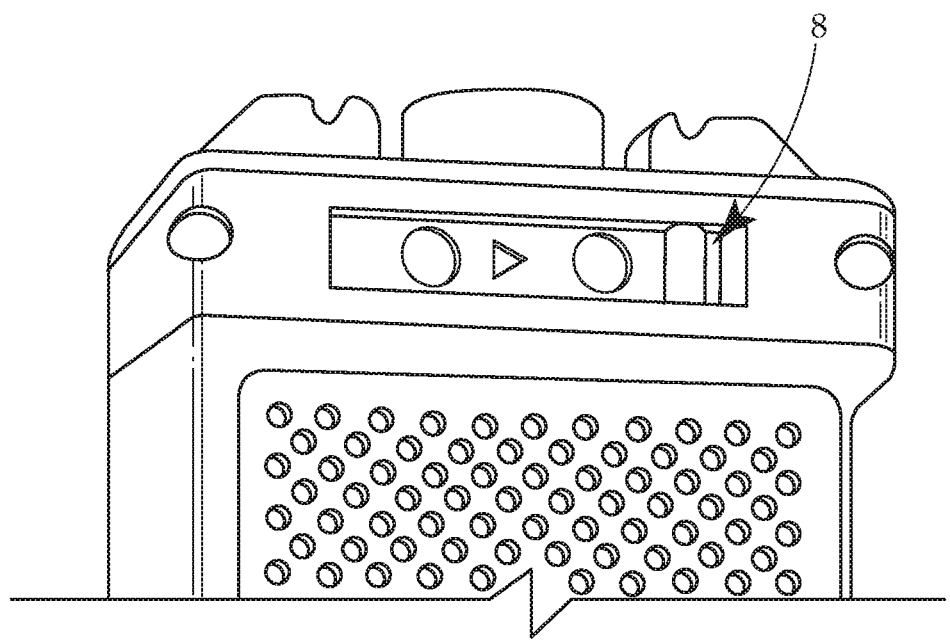
FIG. 3B provides a view of an aspect of a speaker in accordance with embodiments of the disclosure.

Referring also to FIG. 3A-3B, blackout slide 8 may manipulated to cover LED lights 6 and 7. Blackout slide 8 may be toggled from left to right by its protruding knob at LED lights 6 and 7. As shown in FIG. 3A LED lights 6 and 7 can be fully exposed. As shown, blackout slide 8 can be moved to the right of the window in which LED lights 6 and 7 are located such that blackout slide 8 covers LED lights 6 and 7, preventing LED lights 6 and 7 from giving off light. Blackout slide 8 can further be positioned to adjust the amount of light given off by LED lights 6 and 7.

Figure 4:
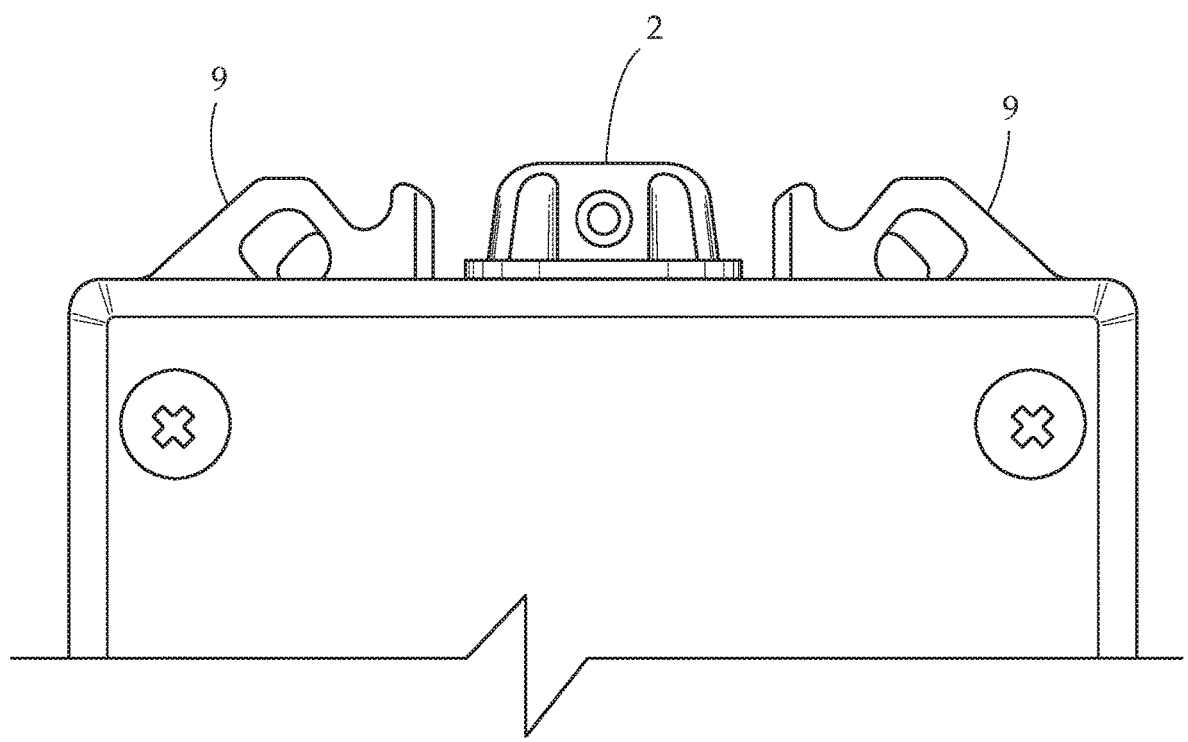
FIG. 4 provides a view of an aspect of a speaker in accordance with embodiments of the disclosure.

Referring to FIG. 1 and connection with FIG. 4, speaker 100 may further include features that aid in the transport or securing of speaker 100. For example, speaker 100 has on surface 1C tie-down holes 9. Tie-down holes 9 may alternatively be used to string a lanyard through them to carry speaker 100.

In some embodiments, speaker 100 may be able to connect to Bluetooth devices. The Bluetooth connectivity of speaker 100 may require the connection of a separate device to speaker that is easily detachable to prevent transmissions/interference in secure areas. Speaker 100 may connect to smartphones, including but not limited to iPhones having iOS operating systems and Android devices. Speaker 100 may further include USB and Wifi connectivity.

Figure 5:
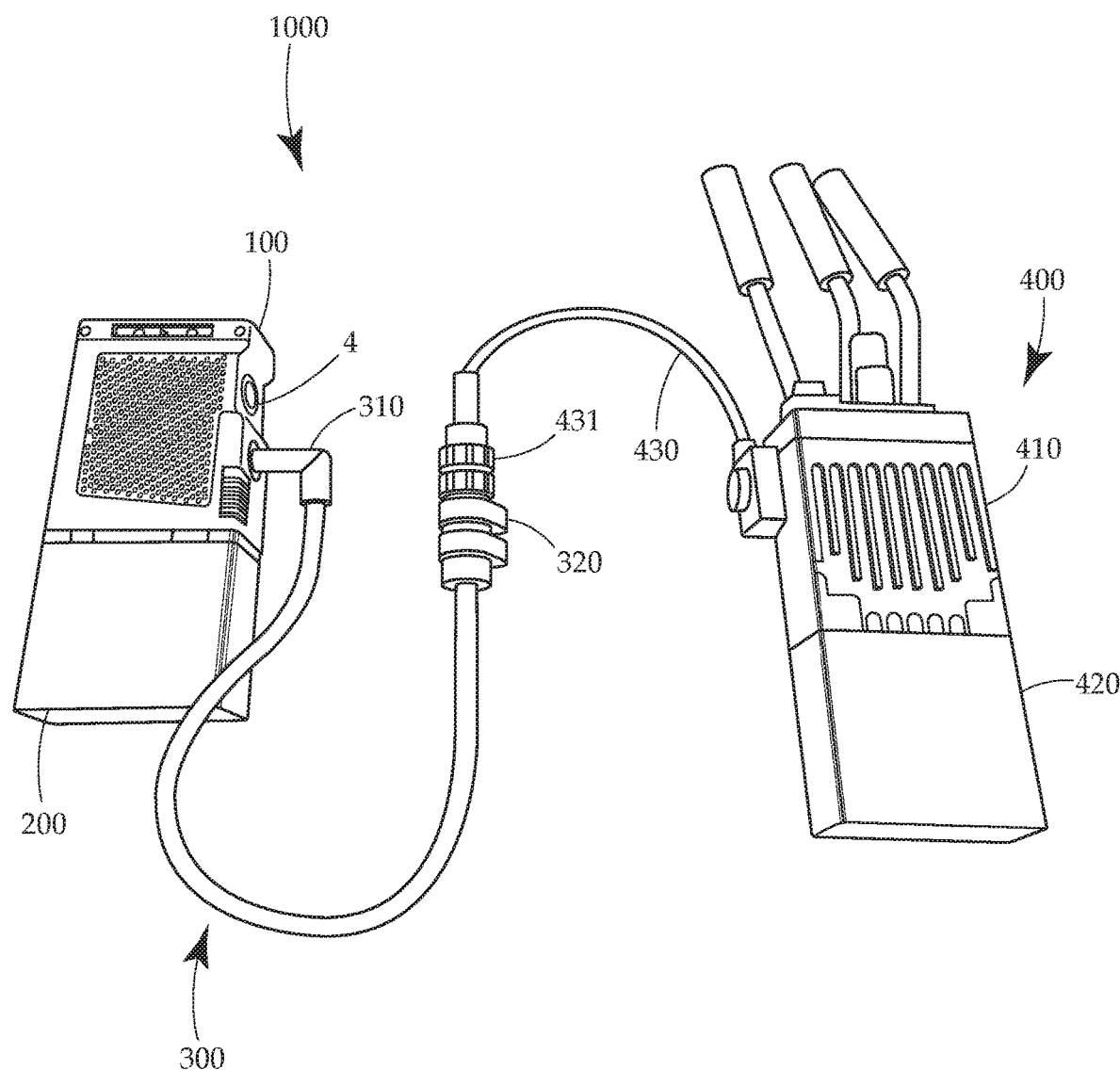
FIG. 5 provides a communication system in accordance with aspects and embodiments of the disclosure.

In operation, and turning to FIG. 5, system 1000 shows speaker 100 connected to battery 200 via connector 10 (not shown). Cable 300 has first end 310 that is received by audio input 4 on speaker 4 and second end 320 that connects with radio system 400. Radio system 400 includes radio 410, radio battery 420, and radio output cable 430. In some embodiments, radio battery 420 and battery 200 may be the same type of battery and may be interchangeable. Radio output cable 430 further includes output connector 431. Radio cable output connector 431 mates with second cable end 320. First end 310 may be a standard 1/8$^{th}$ inch audio jack. Cable 300 may be 3.5 MM audio cable or a 6-pin U-229 cable. Cable 300 may be any length and may be sized according to need.

The disclosed speakers may be provided in a compact kit. For example, the disclosed speakers may be provided in a kit that includes everything needed for speaker operability. The kit may be enclosed in a rigid, hard case to protect the kit's components, which may include the speaker, a speaker cleaning kit, one or more pouches, one or more batteries, one or more power adapters, and one or more radio connector cables.

Figure 6A:
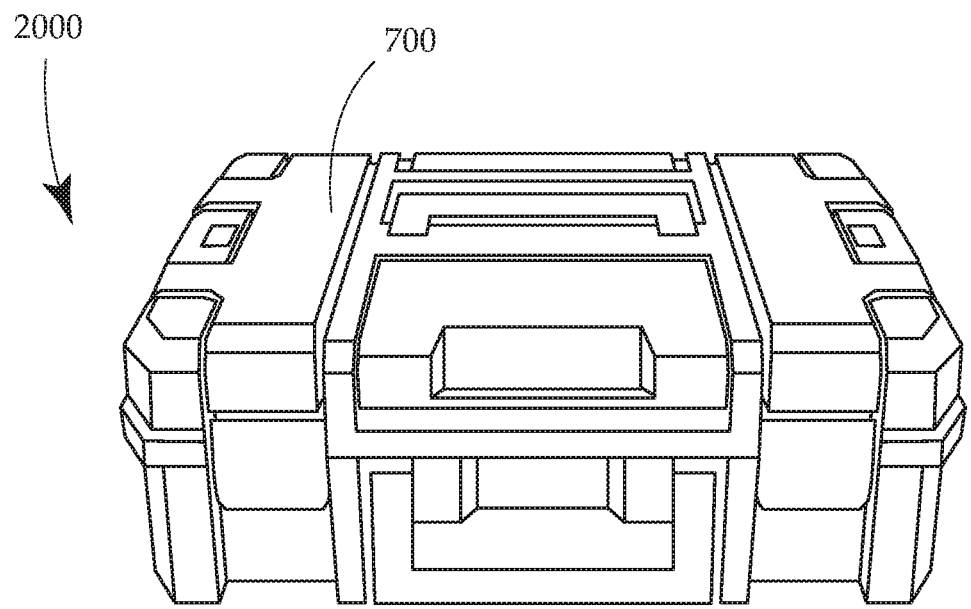
FIG. 6A provides a speaker kit in accordance with aspects and embodiments of the disclosure.
Figure 6B:
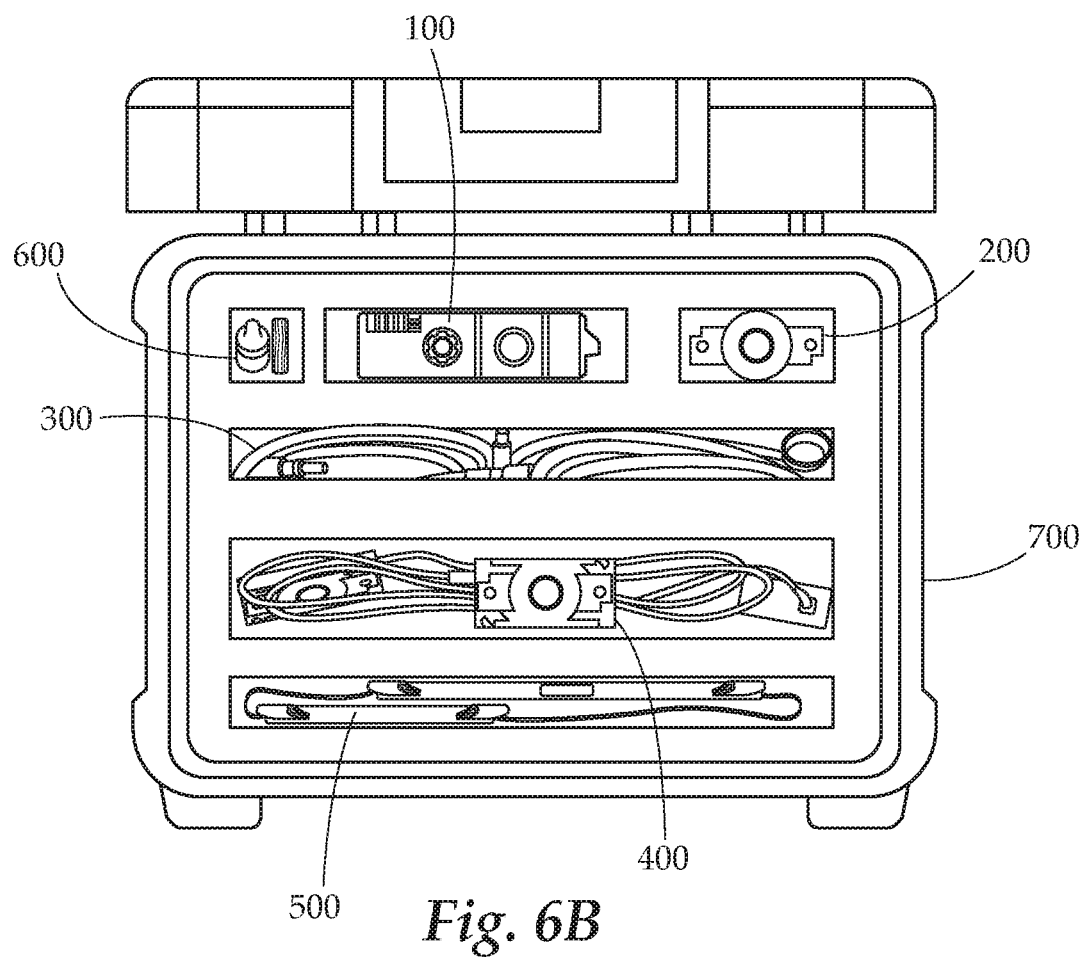
FIG. 6B provides a speaker kit in accordance with aspects and embodiments of the disclosure.

In accordance with aspects and embodiments, kit 2000 is shown in FIGS. 6A and 6B, where 5A shows hard clam shell case 700 in a closed position and 5B shows clam shell case 700 open to reveal kit 2000's contents. Kit 2000 includes speaker 100, battery 200, audio cables 300, AC power cables 400, pouches 500, and cleaning kit 600. Battery 200 may be a PRC-148 radio battery that connects directly with the battery mount on speaker 100. Audio cables 300 may be 3.5 mm audio cables and 6-pin U-229 cables of varying lengths for different connections/mounts. The audio cables may terminate in a standard 1/8$^{th}$ inch headphone jack and the headphone jack end may be received by speaker 100. Power cables 400 may be battery and or AC power cables and may include a 110/220 V power cable, a 12V power cable for connection to a vehicle power supple, and a BBXX90 battery power cable. Pouches 500 may be MOLLE pouches and one provided pouch may be a carrying pouch and one provided pouch may be for mounting the speaking in a vehicle or elsewhere.

Speaker 100 may advantageously be stored and operate at extreme temperatures, altitudes, and humidity. Speaker 100 having silicone or other material housing 1 may operate a temperature from about −20° C. to about 60° C. and may be battery operated at a temperature of about 0° C. to about 40° C. Speaker 100 may be storage at temperatures from about −30° C. to about 70° C.

Speaker 100 may operate at an altitude if up to 15,000 ft and in some embodiments, up to 25,000 ft, and may be stored at altitudes of up to 40,000 ft with cabin pressure altitudes of 12,000. Speaker 100 may be able to operate and withstand relative humidity of 95%.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A speaker comprising:
    a housing;
    a flexible membrane;
    an audio port configured to receive a plurality of radio sources;
    a battery connection configured to receive a plurality of power supplies;
    a first LED light configured to turn on when an incoming radio transmission is received by the speaker, and a second LED light adjacent the first LED light configured to change colors when a battery connected to the speaker drops below a threshold percentage of the battery's total charge; and
    a slide having a first position wherein both the first and second LED lights are visible and a second position wherein the first and second LED lights are blocked;
    wherein the speaker is configured to receive radio transmissions from each of a PRC-148 radio, a PRC-152A radio, a PRC-117G radio, a PRC-117G radio, a Wave Relay MPU-4 radio, and a Wave Relay MPU-5 radio;
    wherein the speaker is configured to operate on AC power and DC power;
    wherein the speaker is operable by direct connection to a PRC-148, PRC-152(A), MPU-4, or MPU-5 batteries;
    wherein the speaker is operable by connection to a 12V power supply, a 110/220V power supply, and a BBXX90 battery;
    wherein the audio port is configured to receive a standard $\frac{1}{8}^{th}$ headphone jack;
    wherein the speaker has a weight of less than 1 pound.

* * * * *